(12) United States Patent
Bograd

(10) Patent No.: US 10,837,366 B2
(45) Date of Patent: Nov. 17, 2020

(54) GAS TURBINE

(71) Applicant: DOOSAN HEAVY INDUSTRIES & CONSTRUCTION CO., LTD., Changwon-si (KR)

(72) Inventor: Alexander Bograd, Changwon-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 360 days.

(21) Appl. No.: 15/876,203

(22) Filed: Jan. 22, 2018

(65) Prior Publication Data

US 2018/0216536 A1  Aug. 2, 2018

(30) Foreign Application Priority Data

Jan. 24, 2017 (KR) .......................... 10-2017-0010883

(51) Int. Cl.
| | |
|---|---|
| *F02C 7/18* | (2006.01) |
| *F02C 7/14* | (2006.01) |
| *F02C 9/18* | (2006.01) |
| *F23R 3/46* | (2006.01) |
| *F23R 3/26* | (2006.01) |

(Continued)

(52) U.S. Cl.
CPC .............. *F02C 7/185* (2013.01); *F02C 7/14* (2013.01); *F02C 7/18* (2013.01); *F02C 9/18* (2013.01); *F23R 3/005* (2013.01); *F23R 3/04* (2013.01); *F23R 3/26* (2013.01); *F23R 3/46* (2013.01); *F05D 2220/32* (2013.01); *F05D 2260/211* (2013.01); *F05D 2260/601* (2013.01)

(58) Field of Classification Search
CPC .... F02C 7/14; F02C 7/12; F02C 7/185; F02C 7/1435; F23R 3/002; F05D 2260/323; F05D 2260/324; F05D 2260/212
See application file for complete search history.

(56) References Cited

U.S. PATENT DOCUMENTS

| | | | | |
|---|---|---|---|---|
| 4,120,150 | A | * | 10/1978 | Wakeman ............... F02C 7/185 60/39.091 |
| 5,123,242 | A | * | 6/1992 | Miller ....................... F02C 7/14 165/300 |

(Continued)

FOREIGN PATENT DOCUMENTS

| | | |
|---|---|---|
| EP | 0887612 A2 | 12/1998 |
| JP | 06-257413 A | 9/1994 |

(Continued)

OTHER PUBLICATIONS

A Korean Office Action dated Jul. 20, 2018 in connection with Korean Patent Application No. 10-2017-0010883 which corresponds to the above-referenced U.S. application.

*Primary Examiner* — Todd E Manahan
*Assistant Examiner* — Thuyhang N Nguyen
(74) *Attorney, Agent, or Firm* — Invenstone Patent, LLC

(57) ABSTRACT

Provided is a gas turbine including: a combustor positioned between a compressor and a turbine of a gas turbine; a cooling air discharge unit configured to receive compressed air from the compressor, receive cooling water from a power plant, and discharge cooling air having exchanged heat with the compressed air; and a supply unit configured to supply the cooling air discharged from the cooling air discharge unit to the turbine and the combustor.

13 Claims, 8 Drawing Sheets

(51) Int. Cl.
F23R 3/04 (2006.01)
F23R 3/00 (2006.01)

(56) References Cited

U.S. PATENT DOCUMENTS

| | | | | |
|---|---|---|---|---|
| 5,392,614 | A * | 2/1995 | Coffinberry | F02C 7/12 60/806 |
| 6,877,320 | B2 * | 4/2005 | Linder | F01K 21/047 122/7 B |
| 7,481,060 | B2 * | 1/2009 | Haertel | F02C 7/143 60/39.3 |
| 9,260,974 | B2 * | 2/2016 | Hasting | F01D 11/24 |
| 2014/0126991 | A1 * | 5/2014 | Ekanayake | F02C 7/143 415/1 |

FOREIGN PATENT DOCUMENTS

| | | |
|---|---|---|
| JP | 2000-130760 A | 5/2000 |
| JP | 2003-500585 A | 1/2003 |
| JP | 2010-261458 A | 11/2010 |
| JP | 2013-194740 A | 9/2013 |
| KR | 10-0507011 B1 | 8/2005 |
| KR | 1020160044535 A | 4/2016 |
| WO | WO/2000/071854 | 11/2000 |
| WO | WO/2015/041346 | 3/2015 |

* cited by examiner

[FIG. 1]
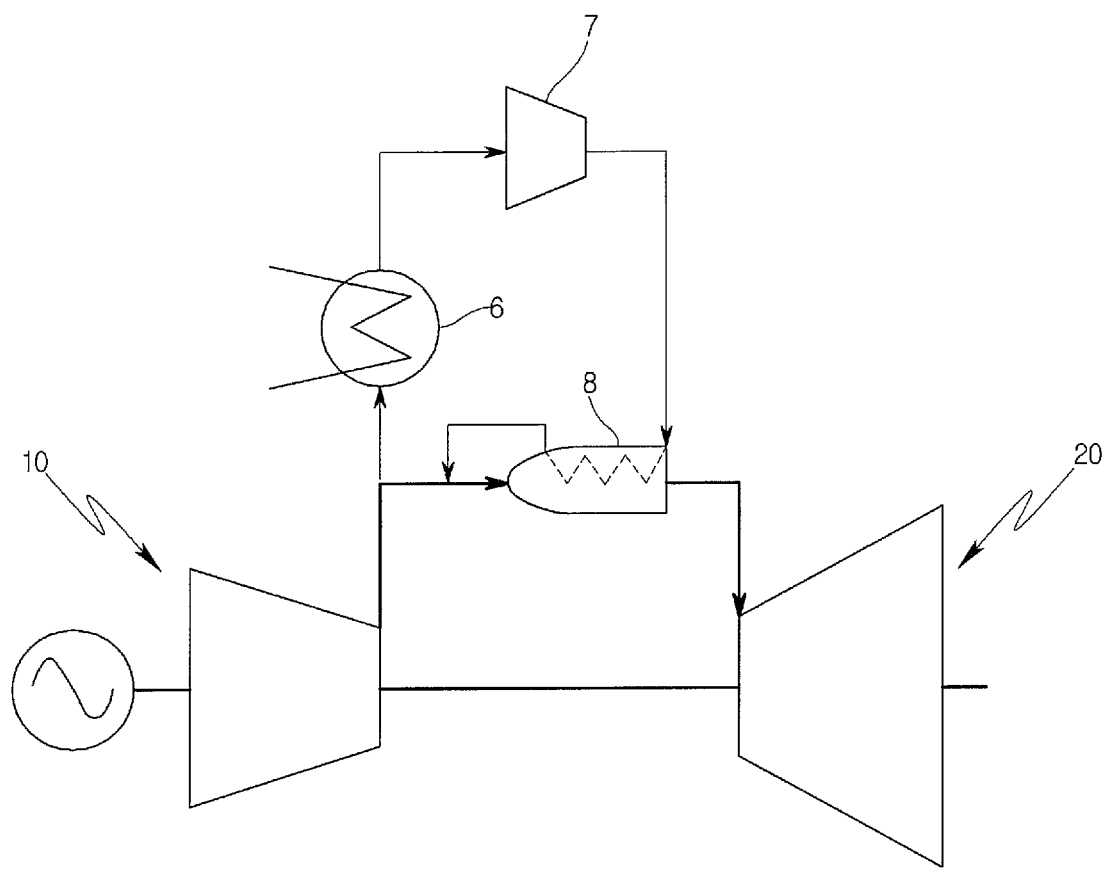

[FIG. 2]
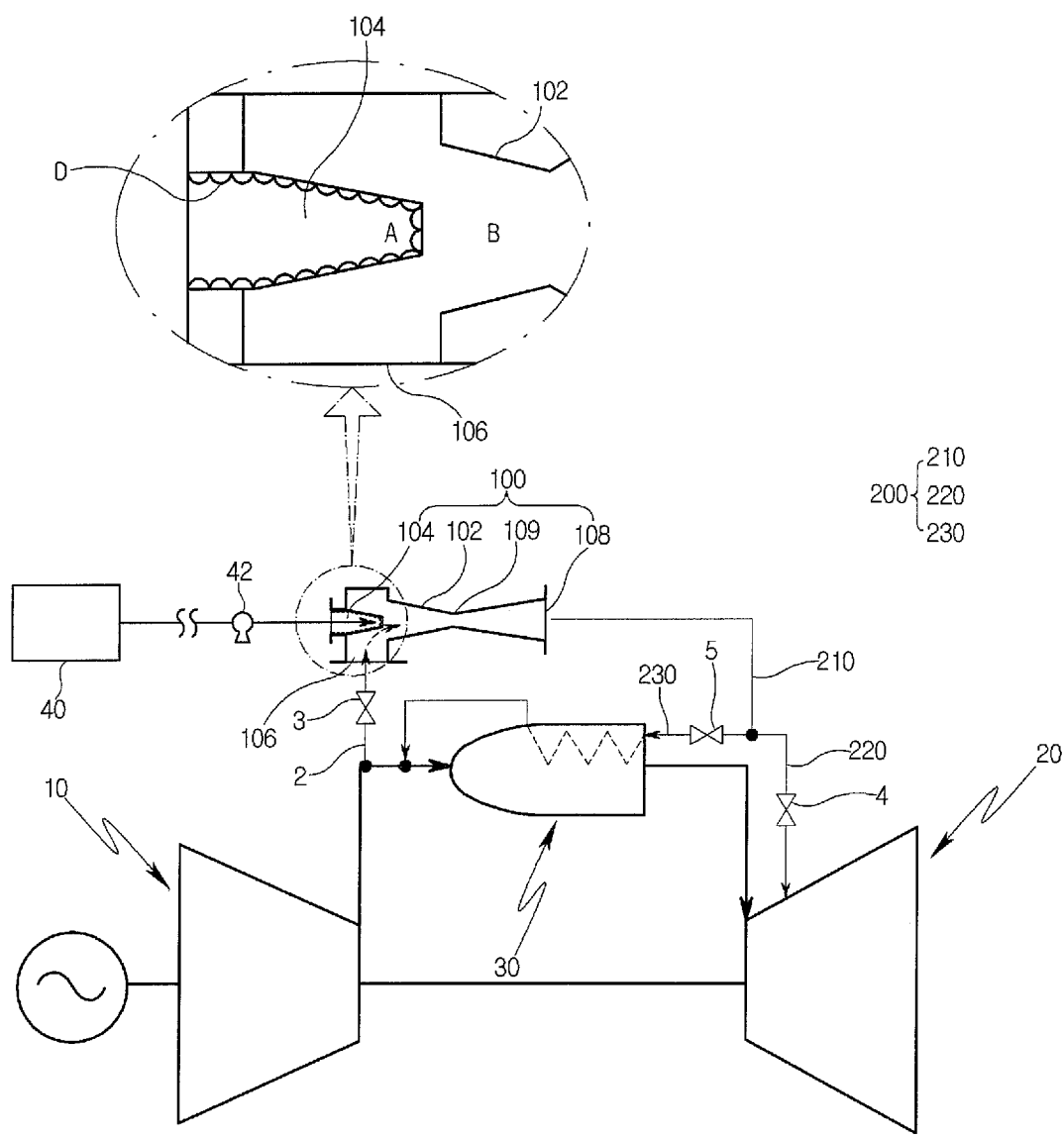

[FIG. 3]
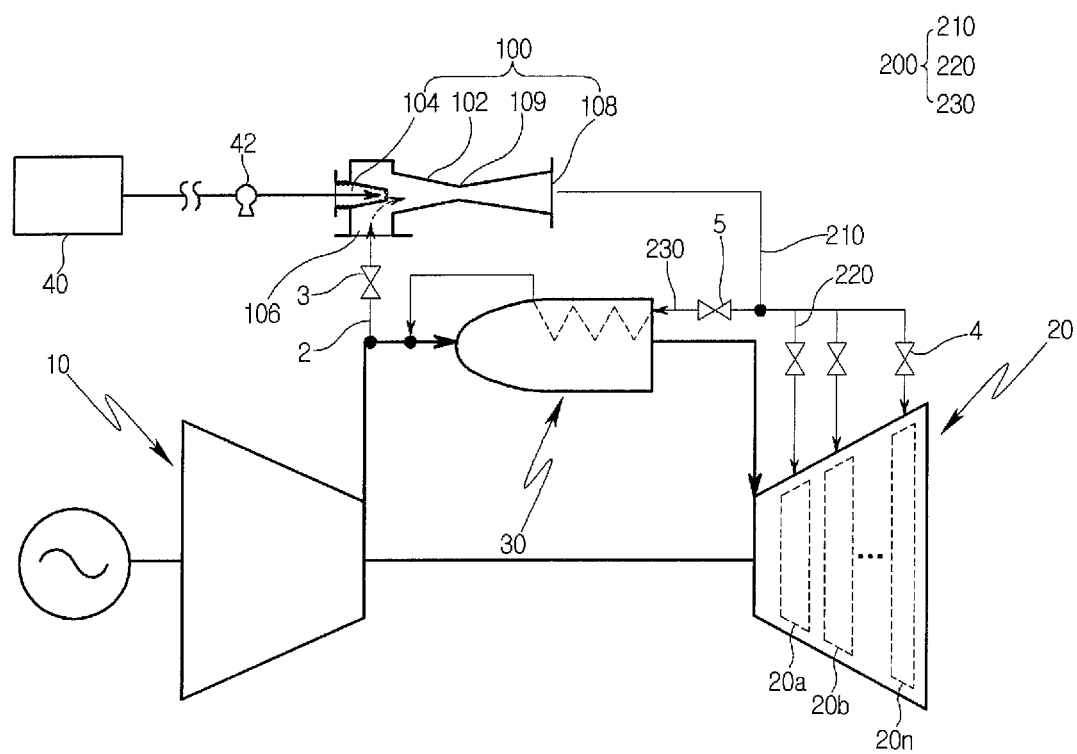

[FIG. 4]
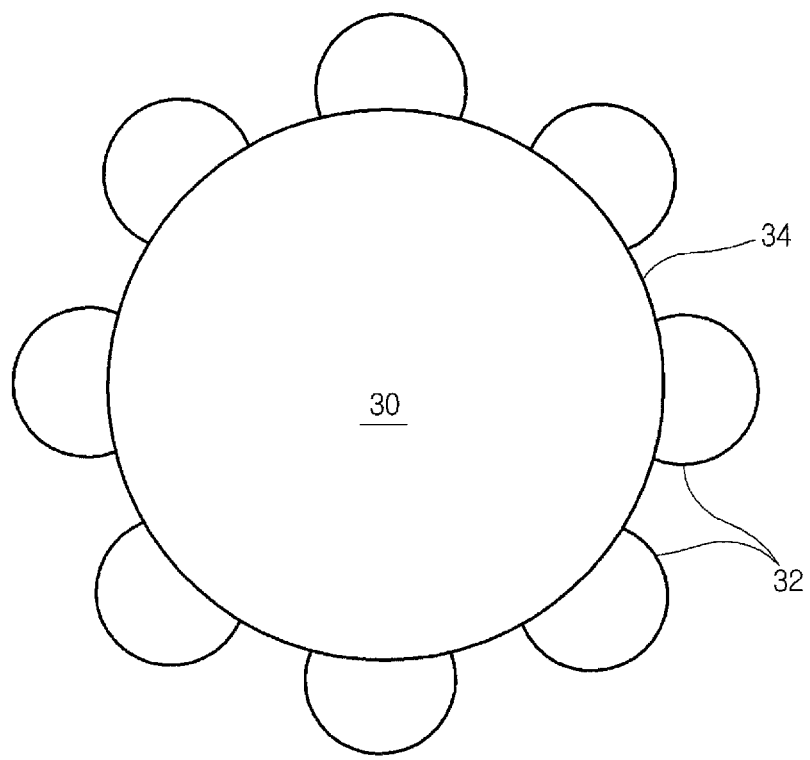

[FIG. 5]
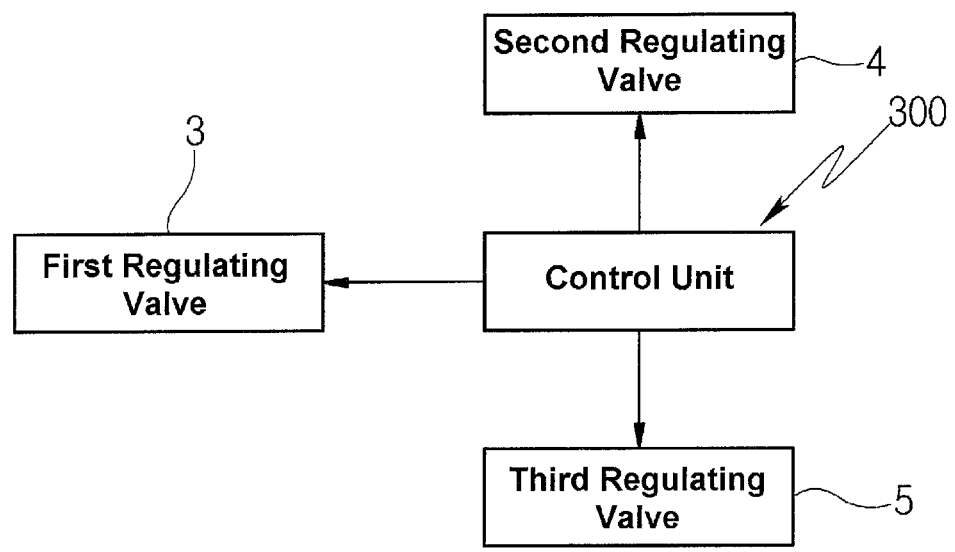

[FIG. 6]
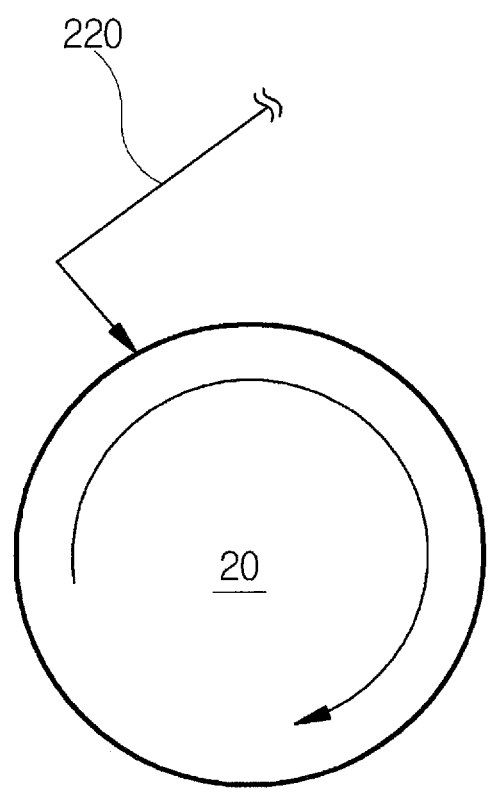

[FIG. 7]
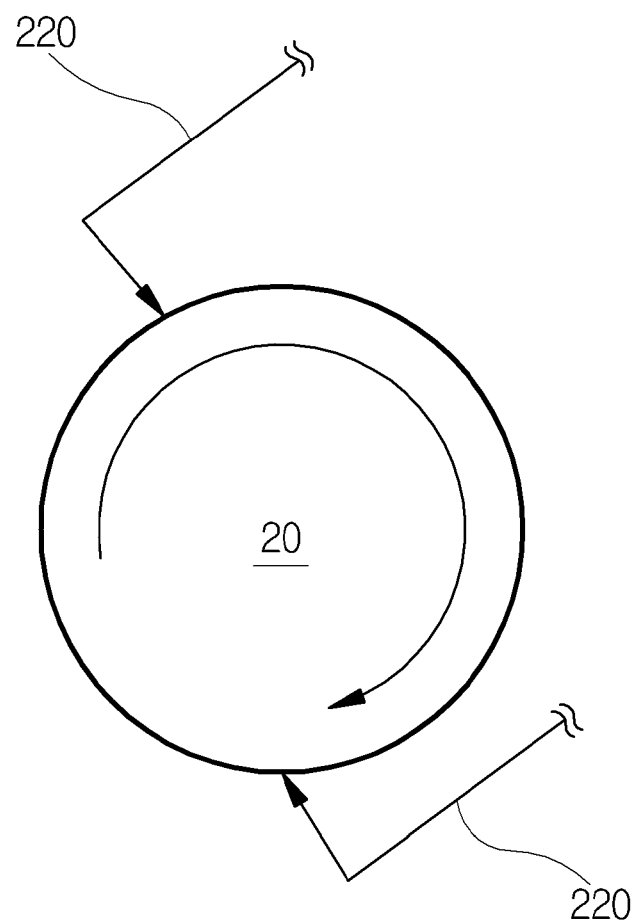

[FIG. 8]
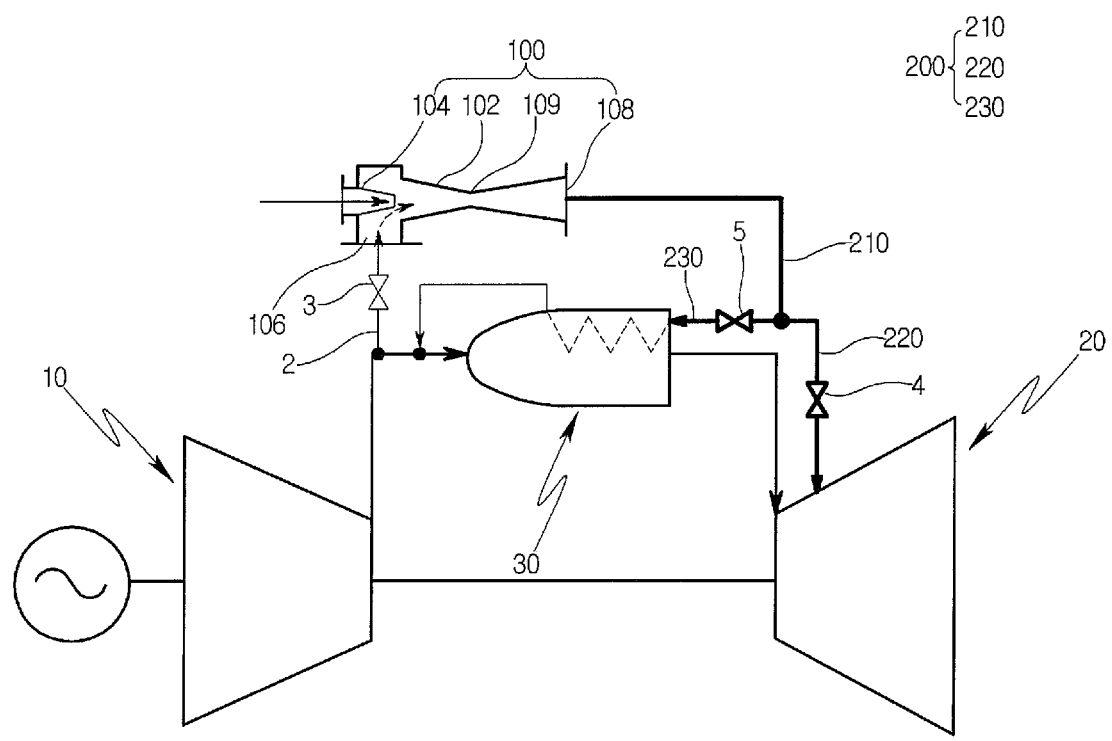

GAS TURBINE

CROSS-REFERENCE(S) TO RELATED APPLICATIONS

This application claims priority to Korean Patent Application No. 10-2017-0010883, filed on Jan. 24, 2017, the disclosure of which is incorporated by reference in its entirety.

BACKGROUND OF THE INVENTION

Field of the Invention

Exemplary embodiments of the present invention relate to a gas turbine, which supplies cooling air cooled through heat exchange with cooling water and compressed air provided from a compressor, in order to cool a turbine, thereby improving the cooling efficiency of the turbine.

Description of the Related Art

In general, an engine or device including a turbine such as a gas turbine or steam turbine is referred to as a turbo machine. The turbo machine is a power generation device for converting thermal energy of fluid into a rotational force as mechanical energy, and includes a rotor, which is axially rotated by fluid, and a stator, which supports and surrounds the rotor.

For example, the gas turbine includes a combustor for generating combustion gas, a turbine driven by the combustion gas discharged from the combustor, and a compressor for supplying high-pressure air to the combustor.

The compressor is rotated to suck and compress external air, and supplies the compressed air to the combustor. The combustor supplies fuel to the compressed air, combusts the fuel mixture to generate high-temperature high-pressure combustion gas, and supplies the generated combustion gas to the turbine.

The high-temperature high-pressure combustion gas discharged from the combustor drives moving blades of the turbine, thereby rotating the rotor of the turbine.

The turbine includes a plurality of turbine disk units such as moving blades and stationary blades, which are alternately installed in multi-stages along the axial direction of the rotor.

The gas turbine configured in such a manner includes a plurality of compressor stages, which extract the compressed air, supply a part of the extracted air to the turbine, and supply the other part of the extracted air to the combustor.

FIG. 1 briefly illustrates a cooling device for supplying cooling air to a turbine of a gas turbine according to the related art.

Referring to FIG. 1, the gas turbine according to the related art includes a cooler 6 and a booster compressor 7, in order to supply cooling air to the turbine. The compressed air is supplied to the turbine 20 and a combustor 8.

However, the gas turbine according to the related art may not meet the expectation values of power consumption and efficiency, because the cooler 6 and the booster compressor 7 are operated. Therefore, there is a demand for a structure capable of solving the problem.

SUMMARY OF THE INVENTION

The present invention has been made in view of the above problems, and it is an object of the present invention to provide a gas turbine capable of stably performing a cooling operation even when the temperature and flow rate of cooling air supplied to a turbine and combustor are lowered.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a gas turbine may include: a combustor positioned between a compressor and turbine of a gas turbine; a cooling air discharge unit configured to receive compressed air from the compressor, receive cooling water from a power plant, and discharge cooling air having exchanged heat with the compressed air; and a supply unit configured to supply the cooling air discharged from the cooling air discharge unit to the turbine and the combustor.

The combustor may include a plurality of unit combustors arranged along the outer circumference of a housing unit forming the exterior of the gas turbine, and the cooling air discharged from the cooling air discharge unit may be supplied to each of the unit combustors.

The gas turbine may include the plurality of cooling air discharge units corresponding to the number of the unit combustors, in order to supply the cooling air to the respective unit combustors.

The cooling air discharge unit may receive pressurized cooling water from a water pump unit installed in the power plant.

The cooling air discharge unit may include: a cooling chamber extended into a body forming the exterior of the cooling chamber, providing a space into which the cooling water is introduced, and formed in the body while having a predetermined size; an inlet port opened toward the cooling chamber, and receiving the air compressed by the compressor; and an outlet port located at a position separated from the cooling chamber so as to face the front of the cooling chamber, and discharging the cooling air having passed through the cooling chamber.

The cooling air discharge unit may have a diameter changed portion formed in the body extended toward the outside from the cooling chamber, such that the diameter of the cooling air discharge unit decreases from one end thereof toward the diameter changed portion and then increases from the diameter changed portion toward the other end thereof, and the flow rate and pressure of the cooling air may be changed at the diameter changed portion.

The supply unit may include: a main supply pipe having one end connected to the cooling air discharge unit and the other end extended to a region between the compressor and the turbine; a plurality of first branch pipes each having one end connected to the main supply pipe and the other end extended to the turbine; and a plurality of second branch pipes each having one end connected to the main supply pipe and the other end extended toward the combustor.

The first branch pipes may supply the cooling air to unit turbines positioned at the leading end of a turbine shaft, among the plurality of unit turbines constituting the gas turbine.

The gas turbine may further include a compressed air supply pipe connecting the compressor and the cooling air discharge unit, the compressed air supply pipe having a first regulating valve installed thereon.

The gas turbine may further include a control unit configured to control the amount of cooling water supplied to the cooling air discharge unit and an opening degree of the first regulating valve.

The first branch pipe may have a second regulating valve for regulating the flow rate of the cooling air supplied from the main supply pipe, and the second branch pipe may have a third regulating valve for regulating the flow rate of the cooling air supplied from the main supply pipe.

The first branch pipe extended to the gas turbine may supply the cooling air in the tangential direction of turbine blades constituting the unit turbine.

The first branch pipes may be arranged symmetrically in the top-to-bottom direction or side-to-side direction, when seen from the front of the unit turbine.

The control unit may control the amount of cooling water supplied to the cooling chamber such that the temperature of the cooling air supplied to the compressed air supply pipe is maintained at a preset temperature or less.

The control unit may vary the amount of bleed air supplied to the turbine from the compressor depending on the internal temperature of the turbine.

The cooling chamber may have a plurality of dimples D formed on the internal circumferential surface thereof, in order to increase a contact area with the compressed air.

The inside of the cooling chamber may be thermally insulated.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which:
present invention will be more clearly understood from the following detailed description taken in conjunction with the accompanying drawings, in which:

FIG. 1 is a view illustrating a cooling device supplying cooling air to a turbine of a gas turbine according to a related art;

FIG. 2 is a view illustrating a gas turbine and a cooling air discharge unit according to an embodiment of the present invention;

FIG. 3 is a view illustrating branch pipes extended toward unit turbines installed in the gas turbine according to an embodiment of the present invention;

FIG. 4 is a view illustrating an arrangement of unit combustors installed in a combustor according to an embodiment of the present invention;

FIG. 5 is a view illustrating a control unit and first to third regulating valves connected to the control unit according to an embodiment of the present invention;

FIG. 6 and are views illustrating examples in which a first branch pipe is disposed toward the turbine according to an embodiment of the present invention; and FIG. 8 is a view illustrating an operation state of the gas turbine according to an embodiment of the present invention.

DESCRIPTION OF SPECIFIC EMBODIMENTS

Hereafter, a gas turbine according to an embodiment of the present invention will be described with reference to the accompanying drawings. FIG. 2 illustrates a gas turbine and a cooling air discharge unit according to an embodiment of the present invention, FIG. 3 illustrates branch pipes extended toward unit turbines installed in the gas turbine according to an embodiment of the present invention, FIG. 4 briefly illustrates an arrangement of unit combustors installed in a combustor according to an embodiment of the present invention, and FIG. 5 illustrates a control unit and first to third regulating valves connected to the control unit according to an embodiment of the present invention. Referring to FIGS. 2 to 5, the gas turbine according to an embodiment of the present invention can directly supply a portion of cooling air to a turbine 20, supply the remaining portion of the cooling air to a combustor 30, and reduce overheating caused by an operation of the turbine 20, thereby improving cooling efficiency.

For this operation, the gas turbine includes: the combustor 30 positioned between a compressor 10 and the turbine 20; a cooling air discharge unit 100 configured to receive compressed air from the compressor 10, receive cooling water from a power plant 40, and discharge cooling air having exchanged heat with the cooling water; and a supply unit 200 configured to supply the cooling air discharged from the cooling air discharge unit 100 to the turbine 20 and the combustor 30.

The gas turbine according to an embodiment of the present invention may substantially reduce the temperature of the air, for example to a half of the temperature as compared with the gas turbine according to the related art, thereby minimizing the amount of bleed air supplied to the turbine 20. This configuration will be described in detail later when the cooling air discharge unit 100 is described.

In this case, the gas turbine according to an embodiment of the present invention can significantly reduce the amount of bleed air supplied to the turbine 20, compared to the gas turbine according to the related art. Furthermore, since the turbine 20 can be cooled by a smaller amount of cooling air than in the gas turbine according to the related art, the cooling efficiency can be improved.

The cooling air discharge unit 100 according to an embodiment of the present invention receives pressurized cooling water from a water pump 42 installed in the power plant 40. When the water pump 42 supplies cooling water to the cooling air discharge units 100 corresponding to a plurality of unit combustors 32, the water pump 42 pressurizes the cooling water at a predetermined pressure, and supplies the pressurized cooling water to the cooling air discharge units 100.

For example, a water pump installed in a power plant may be used as the water pump 42. At this time, depending on the capacity of the power plant 40, a plurality of water pumps 42 may be installed to stably supply cooling water to the plurality of cooling air discharge units 100.

The cooling air discharge unit 100 according to an embodiment of the present invention includes a cooling chamber 104, an inlet port 106 and an outlet port 108. The cooling chamber 104 formed in the body 102 with a predetermined size is extended into the body 102 of the cooling air discharge unit 100 to form the exterior of the cooling air discharge unit 100 while providing a space into which the cooling water is introduced. The inlet port 106 is opened toward the cooling chamber 104 and the air compressed by the compressor 10 passes therethrough. The outlet port 108 is located at a position separated from the cooling chamber 104 and faces a front portion of the cooling chamber 104. The cooling air having passed through the cooling chamber 104 is discharged through the outlet port 108.

The cooling air discharge unit 100 according to an embodiment of the present invention has a diameter changed portion 109 formed in the body 102, which is extended from the cooling chamber 104 to the outside. The diameter of the cooling air discharge unit 100 decreases from one end thereof toward the diameter changed portion 109, and then increases from the diameter changed portion 109 toward the other end thereof.

When the compressed air is moved from the inlet port 106 toward the outlet port 108, the flow rate and pressure of the compressed air may be changed through the diameter changed portion 109.

For example, when the compressed air is passed through the diameter changed portion 109, the pressure and flow rate of the compressed air are lowered.

For reference, the inlet port 106 is positioned in the 6 o'clock direction corresponding to the bottom of the cooling chamber 104 in FIG. 2, and the outlet port 108 is positioned in the 3 o'clock direction based on the cooling chamber 104.

The cooling chamber 104 of the cooling air discharge unit 100 exchanges heat with a specific amount of compressed air moved from the compressor 10. The compressed air is maintained at a high temperature of 400 to 500° C., for example, before entering the cooling chamber 104. However, when the compressed air passes through the cooling chamber 104, the compressed air may be cooled to around 200° C.

The cooling chamber 104 is formed in a nozzle shape, and the compressed air is injected to a position B through a diameter-reduced portion A of the cooling chamber 104 having a nozzle shape. In this case, the distance between gas molecules of the compressed air at the position B may be maintained at a relatively longer distance due to the increased area therein.

Since a repulsive force caused by collisions among gas molecules of the compressed air is reduced by the Joule-Thomson effect, the kinetic energy decreases. However, since the distance between the gas molecules is increased, the temperature decreases.

For example, when the gas molecules constituting the compressed air collide with each other, heat is generated. However, when the compressed air is rapidly expanded through the cooling chamber 104, the temperature decreases due to the reduction in the number of collisions among the gas molecules. Based on this principle, the compressed air may be supplied to the turbine 20.

In an embodiment of the present invention, the inside of the cooling chamber 104 may be thermally insulated to suppress a temperature change, thereby inducing the above-described effect more stably.

When the time required for heat exchange in the cooling chamber 104 is adjusted, the cooling air can be cooled down to a specific temperature. Therefore, the temperature of the cooling air supplied to the turbine 20 may be adjusted to the optimal temperature.

Therefore, the turbine 20 may receive a reduced amount of bleed air, and thus the cooling efficiency can be improved.

Accordingly, the cooling air may be supplied to the turbine 20 after the temperature of the cooling air has been substantially lowered. Thus, although a smaller amount of bleed air than in the gas turbine according to the related is supplied to the turbine 20, the cooling effect for the turbine 20 can be improved.

Moreover, since the temperature of the cooling air supplied to the turbine 20 can be lowered only by the cooling air discharge unit 100, the turbine 20 can be stably cooled without an additional component, such as a booster compressor (not illustrated) to increase the pressure of the cooling air.

In an embodiment of the present invention, the temperature of the compressed air is primarily lowered while the compressed air passes through the cooling chamber 104, and secondarily lowered while the compressed air passes through the diameter changed portion 109. Therefore, the temperature of the compressed air supplied to the turbine 20 can be stably lowered.

In an embodiment of the present invention, the cooling chamber 104 formed in the cooling air discharge unit 100 may have a predetermined size in a cross-sectional shape as illustrated in FIG. 2, but its size is not limited thereto and may be modified to have an increased size such that cooling water can be supplied to the cooling chamber 104.

Furthermore, the cooling chamber 104 may be configured in such a manner that the cooling water is not mixed with the compressed air when it is introduced into the cooling chamber 104, but conducts heat exchange with the compressed air. The gas turbine according to an embodiment of the present invention may include a plurality of cooling chambers 104.

The cooling chamber 104 has a plurality of dimples D formed on the inner circumferential surface thereof in order to increase a contact area with the compressed air. When the contact area is increased, the contact area with the compressed air can be increased in the entire region of the cooling chamber 104, and the heat exchange with the compressed air can be uniformly performed, thereby improving the heat exchange efficiency of the cooling chamber 104.

A compressed air supply pipe 2 is installed to connect the compressor 10 and the cooling air discharge unit 100, and a first regulating valve 3 is installed on the compressed air supply pipe 2. The compressed air supply pipe 2 extended to the cooling air discharge unit 100 may have a structure to allow the compressed air to stably move to the cooling air discharge unit 100.

The compressed air supply pipe 2 may be directly extended as a straight pipe to the cooling air discharge unit 100. However, when curved pipes are connected as few as possible or only one curved pipe is connected to the straight pipe, a pressure drop and loss of the compressed air can be minimized.

The compressed air supply pipe 2 includes a first regulating valve 3 installed thereon. The first regulating valve 3 regulates the amount of compressed air supplied to the cooling air discharge unit 100. Since the first regulating valve 3 includes a microcomputer (not illustrated) to regulate an opening, the amount of compressed air supplied to the cooling air discharge unit 100 may be controlled.

The inlet port 106 is opened at a position facing the cooling chamber 104 in the top-to-bottom direction in FIG. 2. For example, the inlet port 106 may be positioned perpendicular to the cooling chamber 104.

In this case, since a large amount of compressed air can be stably moved toward the cooling chamber 104, the compressed air is supplied without causing a vortex in the region where the cooling chamber 104 is positioned.

The supply unit 200 according to an embodiment of the present invention includes a main supply pipe 210, a first branch pipe 220, and a second branch pipe 230. The main supply pipe 210 has one end connected to the cooling air discharge unit 100 and the other end extended to a region between the compressor 10 and the turbine 20. The first branch pipe 220 has one end connected to the main supply pipe 210 and the other end extended to the turbine 20, and the second branch pipe 230 has one end connected to the main supply pipe 210 and the other end extended toward the combustor 30.

The main supply pipe 210 has the same or similar diameter as or to that of the outlet port 108, and is extended at a predetermined length depending on the outer layout of the gas turbine.

The main supply pipe 210, and the first and second branch pipes 220 and 230 have an insulator formed on the outsides thereof, a heat loss of the cooling air supplied to the turbine 20 or the combustor 30 can be minimized.

Referring to FIG. 3, the first branch pipe 220 supplies the cooling air to a unit turbine 20a positioned at the leading end of a turbine shaft, among a plurality of unit turbines 20a to 20n constituting the turbine. For example, the turbine 20 may include the plurality of unit turbines 20a to 20n which are sequentially installed from the left side toward the right side in FIG. 3.

Each of the unit turbines 20a to 20n has a different number of revolutions and a different internal temperature. Thus, when the cooling air having passed through the cooling air discharge unit 100 is supplied to cool the unit turbines, the cooling efficiency can be improved.

In an embodiment of the present invention, when the cooling air discharged from the cooling air discharge unit 100 is supplied to the unit turbines 20a to 20n, the number of first branch pipes 220 extended to the respective unit turbines 20a to 20n may correspond to the number of the unit turbine 20a to 20n.

Here, since the cooling air is supplied to each of the unit turbines 20a to 20n, the cooling efficiency of each turbine stage can be stably maintained.

The first branch pipes 220 each have a second regulating valve 4 installed thereon. Thus, the amount of cooling air supplied to each of the unit turbines 20a to 20n can be independently regulated, thereby further improving the cooling efficiency of the turbine 20.

For example, when a larger amount of cooling air is supplied to a specific unit turbine maintained at a high temperature during operation of the turbine 20, the cooling efficiency can be improved. Therefore, the operation times of the internal components depending on the operation of the turbine 20 can be extended while the power generation efficiency is improved.

The second branch pipe 230 is extended to supply the cooling air discharged from the cooling air discharge unit 100 to a plurality of unit combustors 32.

In FIG. 2, the first branch pipe 220 is illustrated as one solid line. However, FIG. 3 illustrates the plurality of first branch pipes 220 extended toward the respective unit turbines 20a to 20n.

Since the first branch pipes 220 and the second branch pipes 230 are arranged as independent layouts, the cooling air is not mixed.

Referring to FIG. 4, the combustor 30 includes the plurality of unit combustors 32 arranged along the outer circumference of a housing unit 34 forming the exterior of the gas turbine. The plurality of unit combustors 32 are arranged at predetermined intervals along the outer circumference of the housing unit 34, and provide a space in which high-temperature high-pressure gas and fuel are mixed and combusted.

The gas turbine may include the plurality of cooling air discharge units 100 corresponding to the number of the unit combustors 32, in order to supply cooling air to the respective unit combustors 32. In this case, the gas turbine has a plurality of paths through which high-temperature compressed air from the unit combustors 32 is supplied to the respective cooling air discharge units 100.

Since the cooling air discharge units 100 have the same structure, the structure illustrated in the drawings can represent the cooling air discharge units 100.

Referring to FIG. 5, the gas turbine according to an embodiment of the present invention may include a control unit 300 configured to control the amount of cooling water supplied to the cooling air discharge unit 100 and an opening of the first regulating valve 3. The control unit 300 is also installed to control the amount of compressed air supplied to the cooling air discharge unit 100, in order to serve as an alternative when a malfunction or breakdown of the microcomputer (not illustrated) installed in the first regulating valve 3 occurs.

In an embodiment of the present invention, the second regulating valve 4 is installed to regulate the flow rate of the cooling air supplied from the main supply pipe 210 to the turbine 20. When the amount of cooling air supplied to the turbine 20 needs to be reduced or the supply of the cooling air needs to be blocked, the opening of the second regulating valve 4 can be automatically controlled to protect the turbine 20.

The second branch pipe 230 according to an embodiment of the present invention has a third regulating valve 5 to regulate the flow rate of the cooling air supplied from the main supply pipe 210. The third regulating valve 5 has the same structure as the second regulating valve 4, and is installed to regulate the amount of cooling air supplied to the corresponding unit combustor 32.

The second and third regulating valves 4 and 5 are installed to stably supply cooling air. When the second and third regulating valves 4 and 5 malfunction or break down, the operation states of the second and third regulating valves 4 and 5 may be controlled by the control unit 300.

Referring to FIGS. 6 and 7, the first branch pipe 220 extended to the gas turbine may supply cooling air in a tangential direction of turbine blades of the turbine 20.

Results obtained by simulating the supply direction of the cooling air during rotation of the turbine 20 show that, when the cooling air is supplied in the tangential direction of the turbine blades with respect to the rotation direction of the turbine blades, the turbine blades can be stably cooled while minimizing the formation of vortex.

As a result, when the cooling air is supplied into the turbine 20, an air flow is formed along the circumferential direction of the turbine 20.

Since the turbine housing (not illustrated) surrounding the outside of the turbine 20 is formed in a cylindrical shape, the cooling air can be moved in the turbine housing while coming in contact with the outer circumferential surfaces of the turbine blades as much as possible.

In an embodiment of the present invention, since the cooling air can be supplied in the tangential direction with respect to the turbine blades, the plurality of unit turbines 20a to 20n can be efficiently cooled. Furthermore, during the operations of the unit turbines 20a to 20n, thermal deformation caused by high-temperature thermal stress can be minimized, and the efficiency of the turbine 20 can be improved through the stable cooling operation.

The first branch pipes 220 according to an embodiment of the present invention may be arranged symmetrically in the top-to-bottom direction or the side-to-side direction, when seen from the front of the turbine 20.

For example, the first branch pipes 220 may be symmetrically arranged to face each other in the top-to-bottom direction, when seen from the front of the turbine 20. In this case, the cooling air is supplied in the arrow direction of the drawings such as FIG. 3. When the first branch pipes 220 are arranged in such a manner, the rotation of the turbine 20 can be stably maintained, and the cooling efficiency can be maintained, which makes it possible to improve the cooling efficiency.

Although not illustrated in the drawings, the first branch pipes 220 can be installed symmetrically in the side-to-side direction, when seen from the front of the turbine 20. In this case, the same operation and effect can be obtained by the cooling air, even though the positions of the first branch pipes 220 are different from when the first branch pipes 220 are installed in the top-to-bottom directions.

Referring to FIG. 5 or 8, the control unit 300 according to an embodiment of the present invention may control the amount of cooling water supplied to the cooling chamber 104, such that the temperature of the cooling air supplied to the compressed air supply pipe 2 can be maintained to less than a preset temperature.

By controlling the amount of cooling water, the control unit 300 can easily adjust the temperature of the cooling air to a preset temperature, due to the heat exchange in the cooling chamber 14. Thus, the cooling efficiency of the turbine 20 or the combustor 30 can be improved.

The control unit according to an embodiment of the present invention changes the amount of bleed air supplied to the turbine 20 from the compressor 10 depending on the internal temperature of the turbine 20.

For example, when the internal temperature of the turbine 20 rises to a preset temperature or more, the control unit 300 may increase the amount of bleed air supplied to the turbine 20, thereby stably cooling the turbine 20.

As indicated by a solid line of FIG. 8, the cooling air discharged from the cooling air discharge unit 100 is supplied to the turbine 20 and the combustor 30 through the main supply pipe 210 and the first and second branch pipes 220 and 230. More specifically, a portion of the cooling air is supplied to the turbine 20, and the remaining portion of the cooling air is supplied to the combustor 30.

When the cooling air heat-exchanged in the cooling air discharge unit 100 is supplied to the turbine 20, the turbine 20 can be stably cooled in a predetermined temperature range at all times. Thus, the cooling efficiency of the turbine 20 is improved.

Furthermore, a portion of the cooling air may be supplied to the combustor 30, and then cool the unit combustors 32, thereby preventing a temperature of the combustor 30 from being increased to a high temperature.

Therefore, a temperature rise of the combustor 30 in which a high temperature condition is maintained can be stably maintained, and a degradation caused by overheating can be minimized.

The cooling air may be recirculated to the combustor 30 after the temperature thereof has risen through heat exchange with each of the unit combustors 32.

According to an embodiments of the present invention, the turbine and the combustor can be stably cooled through a minimum number of components.

Furthermore, the turbine and the combustor can be cooled through cooling air which is cooled through heat exchange with cooling water produced in a power plant. Moreover, since a cooling source for cooling can be easily supplied, the cooling efficiency can be improved through the heat recovery process.

Furthermore, since the amount of bleed air supplied to the turbine can be reduced and the temperature can be lowered, the efficiency of the turbine can be improved.

While the present invention has been described with respect to the specific embodiments, it will be apparent to those skilled in the art that various changes and modifications may be made without departing from the spirit and scope of the invention as defined in the following claims.

What is claimed is:

1. A gas turbine comprising:
  a combustor positioned between a compressor and a turbine of the gas turbine;
  a cooling air discharge unit configured to receive compressed air from the compressor, receive cooling water from a power plant, and discharge cooling air having exchanged heat with the cooling water; and
  a supply unit configured to supply the cooling air discharged from the cooling air discharge unit to the turbine and the combustor,
  wherein the cooling air discharge unit comprises:
    a cooling chamber extended into a body, providing a space into which the cooling water is introduced, and formed in the body while having a predetermined size;
    an inlet port opened toward the cooling chamber to receive the air compressed by the compressor; and
    an outlet port located at a position separated from the cooling chamber so as to face a front portion of the cooling chamber and discharging the cooling air having passed through the cooling chamber,
  wherein the cooling air discharge unit has a diameter changed portion formed in the body thereof, such that the diameter of the cooling air discharge unit decreases generally from the inlet port toward the diameter changed portion and then increases from the diameter changed portion toward the outlet port, and a flow rate and pressure of the cooling air is changed at the diameter changed portion,
  wherein the cooling chamber is located upstream of the diameter changed portion.

2. The gas turbine of claim 1, wherein the combustor comprises a plurality of unit combustors arranged along an outer circumference of a housing forming an exterior of the gas turbine, and the cooling air discharged from the cooling air discharge unit is supplied to each of the plurality of unit combustors.

3. The gas turbine of claim 2, comprising a plurality of cooling air discharge units corresponding to a number of the plurality of unit combustors to supply cooling air to each respective unit combustors.

4. The gas turbine of claim 1, wherein the cooling air discharge unit receives pressurized cooling water from a water pump installed in the power plant.

5. The gas turbine of claim 1, wherein the supply unit comprises:
  a main supply pipe having one end connected to the cooling air discharge unit and the other end extended to a region between the compressor and the turbine;
  a plurality of first branch pipes each having one end connected to the main supply pipe and the other end extended to the turbine; and
  a plurality of second branch pipes each having one end connected to the main supply pipe and the other end extended toward the combustor.

6. The gas turbine of claim 5, wherein
each of the plurality of first branch pipes has a second regulating valve to regulate the flow rate of the cooling air supplied from the main supply pipe, and
each of the plurality of second branch pipes has a third regulating valve to regulate the flow rate of the cooling air supplied from the main supply pipe.

7. The gas turbine of claim 5, wherein the plurality of first branch pipes supply the cooling air to unit turbines constituting the gas turbine.

8. The turbine, of claim 7, wherein the plurality of first branch pipes extended to the gas turbine supply the cooling air in a tangential direction of turbine blades constituting the unit turbines.

9. The gas turbine of claim 1, further comprising a compressed air supply pipe connecting the compressor and the cooling air discharge unit, the compressed air supply pipe having a first regulating valve installed thereon.

10. The gas turbine of claim 9, further comprising a controller connected to the turbine of the gas turbine and to the first regulating valve and configured to control an amount of cooling Water supplied to the cooling air discharge unit to regulate a temperature of the cooling water therein and an opening of the first regulating valve.

11. The gas turbine of claim 10, wherein the controller regulates an amount of bleed air supplied to the turbine from the compressor depending on an internal temperature of the turbine.

12. The gas turbine of claim 1, wherein the cooling chamber has a plurality of dimples (D) formed on an internal circumferential surface thereof to increase a contact area with the compressed air.

13. The gas turbine of claim 1, wherein an inside of the cooling chamber is thermally insulated.

* * * * *